(12) United States Patent
Chigusa

(10) Patent No.: US 9,250,849 B2
(45) Date of Patent: Feb. 2, 2016

(54) PRINTING SYSTEM, INFORMATION PROCESSOR, AND STORAGE MEDIUM

(71) Applicant: Yoshinari Chigusa, Kanagawa (JP)

(72) Inventor: Yoshinari Chigusa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 7 days.

(21) Appl. No.: 13/912,349

(22) Filed: Jun. 7, 2013

(65) Prior Publication Data

US 2014/0016160 A1    Jan. 16, 2014

(30) Foreign Application Priority Data

Jul. 10, 2012 (JP) ................................. 2012-154460
Feb. 20, 2013 (JP) ................................. 2013-031067

(51) Int. Cl.
*G06F 3/12* (2006.01)

(52) U.S. Cl.
CPC ............ *G06F 3/1297* (2013.01); *G06F 3/1204* (2013.01); *G06F 3/1225* (2013.01); *G06F 3/1285* (2013.01)

(58) Field of Classification Search
None
See application file for complete search history.

(56) References Cited

U.S. PATENT DOCUMENTS

| | | | | |
|---|---|---|---|---|
| 5,982,994 A * | 11/1999 | Mori et al. | ................... | 358/1.15 |
| 6,154,287 A * | 11/2000 | Nemoto et al. | ............... | 358/1.15 |
| 6,269,400 B1 * | 7/2001 | Douglas et al. | ............... | 709/224 |
| 6,292,267 B1 * | 9/2001 | Mori et al. | ................... | 358/1.15 |
| 6,301,012 B1 * | 10/2001 | White et al. | ................. | 358/1.15 |
| 6,425,019 B1 * | 7/2002 | Tateyama et al. | ................ | 710/11 |
| 6,477,589 B1 * | 11/2002 | Suzuki et al. | .................... | 710/18 |
| 6,523,696 B1 * | 2/2003 | Saito et al. | ..................... | 709/223 |
| 6,583,886 B1 * | 6/2003 | Ochiai | .......................... | 358/1.15 |
| 6,721,286 B1 * | 4/2004 | Williams et al. | .............. | 370/282 |
| 6,952,831 B1 * | 10/2005 | Moore | .......................... | 719/327 |
| 7,089,294 B1 * | 8/2006 | Baskey et al. | ................. | 709/219 |
| 7,143,150 B1 * | 11/2006 | Nuggehalli | .................... | 709/221 |
| 7,170,878 B2 * | 1/2007 | Fukuda | ......................... | 370/338 |
| 7,522,299 B2 * | 4/2009 | Nguyen et al. | ................ | 358/1.15 |
| 7,613,845 B2 * | 11/2009 | Reilly | ............................. | 710/15 |
| 7,618,115 B2 | 11/2009 | Chigusa | | |
| 7,769,780 B2 * | 8/2010 | Kashiwagi et al. | ........... | 707/783 |
| 7,860,698 B2 * | 12/2010 | Yamazaki et al. | .............. | 703/13 |
| 7,895,609 B2 * | 2/2011 | Inoue | ............................ | 719/327 |
| 8,161,148 B2 * | 4/2012 | Tamura | ......................... | 709/223 |
| 8,213,053 B2 | 7/2012 | Chigusa | | |
| 8,275,861 B2 * | 9/2012 | Kawai | ........................... | 709/220 |
| 8,755,069 B2 * | 6/2014 | Nakagawa | ................... | 358/1.15 |
| 8,773,687 B2 * | 7/2014 | Liu | ............................. | 358/1.15 |
| 2001/0013948 A1 * | 8/2001 | Fujiwara et al. | ............. | 358/1.15 |
| 2002/0062407 A1 * | 5/2002 | Tateyama et al. | ............... | 710/11 |
| 2002/0154333 A1 * | 10/2002 | Akashi | ......................... | 358/1.15 |
| 2002/0194417 A1 * | 12/2002 | Suzuki et al. | ................. | 710/305 |

(Continued)

FOREIGN PATENT DOCUMENTS

| | | |
|---|---|---|
| JP | 2004-252785 | 9/2004 |
| JP | 2005-025755 | 1/2005 |

(Continued)

*Primary Examiner* — Ted Barnes
(74) *Attorney, Agent, or Firm* — IPUSA, PLLC

(57) ABSTRACT

A printing system includes an identification part configured to identify a printing protocol to be used with respect to an image processor in creating a print queue for displaying a status of the image processor and a reflection part configured to reflect, in the print queue, a definition of a communication setting used for bidirectional communications between an information processor and the image processor, the definition corresponding to the identified printing protocol.

15 Claims, 13 Drawing Sheets

(56) References Cited

U.S. PATENT DOCUMENTS

| | | | |
|---|---|---|---|
| 2003/0074427 A1* | 4/2003 | Haines et al. | 709/220 |
| 2004/0190032 A1* | 9/2004 | Ferlitsch | 358/1.13 |
| 2004/0218209 A1* | 11/2004 | Hamaguchi et al. | 358/1.15 |
| 2005/0138226 A1* | 6/2005 | Tateyama et al. | 710/11 |
| 2005/0219640 A1* | 10/2005 | Kasatani | 358/402 |
| 2006/0021008 A1* | 1/2006 | Mokuya et al. | 726/2 |
| 2007/0013936 A1* | 1/2007 | Ishimoto | 358/1.13 |
| 2008/0068644 A1* | 3/2008 | Yanagi | 358/1.15 |
| 2008/0231886 A1* | 9/2008 | Wehner et al. | 358/1.15 |
| 2009/0066998 A1* | 3/2009 | Kato | 358/1.15 |
| 2009/0144401 A1* | 6/2009 | Kawai | 709/220 |
| 2009/0303540 A1* | 12/2009 | Akashi | 358/1.15 |
| 2010/0042736 A1* | 2/2010 | Ray et al. | 709/230 |
| 2010/0082730 A1* | 4/2010 | Fujimori | 709/202 |
| 2010/0141988 A1* | 6/2010 | Kai | 358/1.15 |
| 2010/0214603 A1* | 8/2010 | Tamura | 358/1.15 |
| 2010/0225957 A1* | 9/2010 | Liu | 358/1.15 |
| 2010/0328707 A1* | 12/2010 | Miyake | 358/1.15 |
| 2011/0075205 A1* | 3/2011 | Oomura | 358/1.15 |
| 2011/0075207 A1* | 3/2011 | Nakata | 358/1.15 |
| 2011/0122437 A1* | 5/2011 | Shimohira | 358/1.15 |
| 2011/0188080 A1* | 8/2011 | Chigusa | 358/1.15 |
| 2011/0255115 A1* | 10/2011 | Tokuda | 358/1.13 |
| 2012/0216250 A1 | 8/2012 | Chigusa | |
| 2012/0257245 A1* | 10/2012 | McCoog et al. | 358/1.15 |
| 2013/0201494 A1* | 8/2013 | Sweet et al. | 358/1.9 |
| 2013/0201503 A1* | 8/2013 | Miller et al. | 358/1.13 |
| 2013/0201519 A1* | 8/2013 | Duyk et al. | 358/1.15 |
| 2013/0227519 A1* | 8/2013 | Maleport | 717/106 |

FOREIGN PATENT DOCUMENTS

| | | |
|---|---|---|
| JP | 2006-127218 | 5/2006 |
| JP | 2007-323234 | 12/2007 |
| JP | 2008-097587 | 4/2008 |
| JP | 2010-198367 | 9/2010 |

* cited by examiner

FIG.6A

```
*%For MacOSX10.5 or later Plugin-Module  (Only for MacOSX10.5 or later PPD) ========
*APAutoSetupTool: "/Library/Printers/RICOH/Utilities/AutoSetupR12S.app/Contents/MacOS/AutoSetupToolR12S"

*%========== For Supply Levels Begin
*%For MacOSX10.5 or later Plugin-Module  (Only for MacOSX10.5 or later PPD) ========
*cupsFilter: "application/vnd.cups-command 0
/Library/Printers/RICOH/Filters/commandFilterR12S.app/Contents/MacOS/commandFilterR12S"
*cupsCommands: ""

*RICupsCommands usb: "ReportLevels"
*RICupsCommands lpd: ""
*RICupsCommands ipp: ""
*RICupsCommands socket: "ReportLevels AutoConfigure"
*RICupsCommands dnssd: "ReportLevels AutoConfigure"
*RICupsCommands mdns: "ReportLevels AutoConfigure"

*cupsSNMPSupplies: True

*RICupsSNMPSupplies usb: False
*RICupsSNMPSupplies lpd: True
*RICupsSNMPSupplies ipp: True
*RICupsSNMPSupplies socket: False
*RICupsSNMPSupplies dnssd: False
*RICupsSNMPSupplies mdns: False

*RIMarkerTypes: "toner"
*cupsMarkerName 1/Cyan Toner: "#00ffff"
*cupsMarkerName 2/Magenta Toner: "#ff00ff"
*cupsMarkerName 3/Yellow Toner: "#ffff00"
*cupsMarkerName 0/Black Toner: "#000000"
*%========== For Supply Levels End
```

```
*%========== Installable Options ==========
*%========== & System Management ==========

*OpenGroup: InstallableOptions/Installable Options

*OpenUI *OptionTray/Option Tray: PickOne
*DefaultOptionTray: NotInstalled
*OptionTray NotInstalled/Not Installed: ""
*OptionTray 1Cassette/Tray 2: ""
*OptionTray 2Cassette/Tray 2 and 3: ""
*?OptionTray: "
save
mark
(NotInstalled)
userdict /86f6369627 known {
userdict /86f6369627 get
/perifdict get /inslot get dup type /arraytype eq {
    {
    dup 2 eq {(2Cassette) exit} if
    dup 1 eq {(1Cassette)}{pop} ifelse
    } forall
}{pop} ifelse
}if
= flush
cleartomark
restore
"
*End
*CloseUI: *OptionTray
```

```
*OpenUI *InnerTray2/Internal Tray 2: PickOne
*DefaultInnerTray2: NotInstalled
*InnerTray2 NotInstalled/Not Installed: ""
*InnerTray2 Installed/Installed: ""
*?InnerTray2: "
save
mark
(NotInstalled)
userdict /86f6369627 known {
userdict /86f6369627 get
/perifdict get /outslot get dup type /arraytype eq {
   {
   dup 1 eq {(Installed) exit} if
   pop
   } forall
}{pop} ifelse
} if
= flush
cleartomark
restore
"
*End
*CloseUI: *InnerTray2
```

D6 points to *DefaultInnerTray2 line; 106 labels the box.

FIG.6D

```
*%========= HardDisk =========
*OpenUI *HardDisk/Hard Disk: PickOne
*DefaultHardDisk: NotInstalled
*HardDisk NotInstalled/Not Installed: ""
*HardDisk Installed/Installed: ""
*?HardDisk:"
save
mark
{(%disk1%) currentdevparams} stopped
{(NotInstalled)} {(Installed)} ifelse
= flush
cleartomark
restore
"
*End
*CloseUI: *HardDisk

*CloseGroup: InstallableOptions
```

D7 points to the `*DefaultHardDisk: NotInstalled` line (approximately). 106 labels the box.

FIG.7

| PRINTING PROTOCOL TO BE USED | CONTENTS OF UPDATING OF DEFINITION OF *cupsCommands BY AutoSetupTool | CONTENTS OF UPDATING OF DEFINITION OF *cupsSNMPSupplies BY AutoSetupTool |
|---|---|---|
| USB | "ReportLevels" | False |
| LPD | "" | True |
| IPP | "" | True |
| Socket | "ReportLevels AutoConfigure" | False |
| DNSSD | "ReportLevels AutoConfigure" | False |
| MDNS | "ReportLevels AutoConfigure" | False |

FIG.8

```
*%For MacOSX10.5 or later Plugin-Module (Only for MacOSX10.5 or later PPD) ======
*APAutoSetupTool: "/Library/Printers/RICOH/Utilities/AutoSetupToolR12S.app/Contents/MacOS/AutoSetupToolR12S"

*%======= For Supply Levels Begin
*%For MacOSX10.5 or later Plugin-Module (Only for MacOSX10.5 or later PPD) ======
*cupsFilter: "application/vnd.cups-command 0
/Library/Printers/RICOH/Filters/commandFilterR12S.app/Contents/MacOS/commandFilterR12S"
*cupsCommands: ""

*RICupsCommands usb: "ReportLevels Clean PrintSelfTestPage"
*RICupsCommands lpd: "Clean PrintSelfTestPage"
*RICupsCommands ipp: "Clean PrintSelfTestPage"
*RICupsCommands socket: "ReportLevels AutoConfigure Clean PrintSelfTestPage  ReportStatus PrintAlignmentPage  SetAlignment"
*RICupsCommands dnssd: "ReportLevels AutoConfigure"
*RICupsCommands mdns: "ReportLevels AutoConfigure"

*cupsSNMPSupplies: True

*RICupsSNMPSupplies usb: False
*RICupsSNMPSupplies lpd: True
*RICupsSNMPSupplies ipp: True
*RICupsSNMPSupplies socket: False
*RICupsSNMPSupplies dnssd: False
*RICupsSNMPSupplies mdns: False

*RIMarkerTypes: "toner"
*cupsMarkerName 1/Cyan Toner: "#00ffff"
*cupsMarkerName 2/Magenta Toner: "#ff00ff"
*cupsMarkerName 3/Yellow Toner: "#ffff00"
*cupsMarkerName 0/Black Toner: "#000000"
*%======= For Supply Levels End
```

106

D11 — (first brace)
D12 — (second brace)

FIG.9

| PRINTING PROTOCOL TO BE USED | CONTENTS OF UPDATING OF DEFINITION OF *cupsCommands BY AutoSetupTool | CONTENTS OF UPDATING OF DEFINITION OF *cupsSNMPSupplies BY AutoSetupTool |
|---|---|---|
| USB | "ReportLevels Clean PrintSelfTestPage ReportStatus PrintAlignmentPage SetAlignment" | False |
| LPD | "Clean PrintSelfTestPage" | True |
| IPP | "Clean PrintSelfTestPage" | True |
| Socket | "ReportLevels AutoConfigure Clean PrintSelfTestPage ReportStatus PrintAlignmentPage SetAlignment" | False |
| DNSSD | "ReportLevels AutoConfigure" | False |
| MDNS | "ReportLevels AutoConfigure" | False |

FIG.10

*RImaxAlignment: "3"
*RIAlignment: "Registration HeadPosition DuplexRegistration"
*RImaxRegistration: "3"
*RIminRegistrationValue1: "-10"
*RImaxRegistrationValue1: "10"
*RIminRegistrationValue2: "-20"
*RImaxRegistrationValue2: "20"
......
*RImaxHeadPosition: "7"
*RIminHeadPositionValue1: "-5"
*RImaxHeadPositionValue1: "5"
......
*RImaxDuplexRegistration: "2"
*RIminDuplexRegistrationValue1: "-10"
*RImaxDuplexRegistrationValue1: "10"

106

PRINTING SYSTEM, INFORMATION PROCESSOR, AND STORAGE MEDIUM

CROSS-REFERENCE TO RELATED APPLICATIONS

The present application is based upon and claims the benefit of priority of Japanese Patent Applications No. 2012-154460, filed on Jul. 10, 2012, and No. 2013-031067, filed on Feb. 20, 2013, the entire contents of which are incorporated herein by reference.

BACKGROUND OF THE INVENTION

1. Field of the Invention

The present invention relates to printing techniques.

2. Description of the Related Art

Nowadays, as typified by the Zeroconf of the Macintosh (a series of personal computers of the Apple Computer Corporation), a function is known that obtains the option configuration information of a printer through bidirectional communications by simply connecting the printer and a personal computer (PC) using a communication cable, and automatically sets up a condition where printing is ready. PS Query and AutoSetupTool are examples of functions (tools) that automatically obtain and set the option configuration information of a printer at the time of creating a print queue (data that manages the condition of a job and the like on a printer basis).

Also known is a function that obtains supply information such as the amount of remaining toner based on SNMP (Simple Network Management Protocol) and displays the supply information using the display function of an operating system (OS) or an application. As functions (tools) for obtaining the supply information of a printer, snmpInk, which is a Mac OS standard program, and a vendor-created CommandFileFilter are known.

Japanese Laid-Open Patent Application No. 2004-252785 discloses an image printing system that makes it possible to reduce a load on a manager by automating a configuration data obtaining tool in a client-server system.

Japanese Laid-Open Patent Application No. 2010-198367 discloses a technique that makes it possible to cause the device information of a communication device, which the communications device returns in response to a request to obtain the device information from an apparatus that creates an on-demand driver that drives the communications device, to be updated from outside the communication device or automatically updated inside the communication device.

Japanese Laid-Open Patent Application No. 2005-25755 discloses a configuration such as "a system for automatic configuration upon installation of a network printer associated with a printer description file, a driver, a spooler, and a port monitor, wherein the system includes a bidirectional application program interface associated with the spooler for allowing the driver to generate a bidirectional request and a bidirectional response, a syntax within the printer description file for representing and associating the bidirectional request and the bidirectional response with a print feature, extension files stored in the driver for relating bidirectional values and printer values, and a notification infrastructure controlled by the port monitor for providing a bidirectional notification of configuration changes to the driver and selected applications, in order to bidirectionally obtain option configuration information after the installation of a driver and reflect the obtained option configuration information in the print feature of the driver as the automatic reflection of option configuration information through so-called Windows (registered trademark) bidirectional communications.

Japanese Laid-Open Patent Application No. 2006-127218 discloses a technique for installing driver software, which obtains option configuration information and resource information from a desired printer and writes the obtained information to the driver software at the time of its installation.

SUMMARY OF THE INVENTION

According to an aspect of the present invention, a printing system includes an identification part configured to identify a printing protocol to be used with respect to an image processor in creating a print queue for displaying a status of the image processor; and a reflection part configured to reflect, in the print queue, a definition of a communication setting used for bidirectional communications between an information processor and the image processor, the definition corresponding to the identified printing protocol.

According to an aspect of the present invention, an information processor includes an identification part configured to identify a printing protocol to be used with respect to an image processor in creating a print queue for displaying a status of the image processor; and a reflection part configured to reflect, in the print queue, a definition of a communication setting used for bidirectional communications between the information processor and the image processor, the definition corresponding to the identified printing protocol.

According to an aspect of the present invention, a non-transitory computer-readable storage medium has a program stored thereon, wherein the program instructs a processor of a computer to implement an identification part configured to identify a printing protocol to be used with respect to an image processor in creating a print queue for displaying a status of the image processor; and a reflection part configured to reflect, in the print queue, a definition of a communication setting used for bidirectional communications between the computer and the image processor, the definition corresponding to the identified printing protocol.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 6A is a diagram illustrating an example of a PostScript printer description file;

FIG. 6B is another diagram illustrating the example of a PostScript printer description file;

FIG. 6C is another diagram illustrating the example of a PostScript printer description file;

FIG. 6D is another diagram illustrating the example of a PostScript printer description file;

FIG. 7 is a diagram illustrating an example of correspondence between printing protocols to be used and the contents of the updating of respective definitions;

FIG. 8 is a diagram illustrating another example of a PostScript printer description file;

FIG. 9 is a diagram illustrating another example of correspondence between printing protocols to be used and the contents of the updating of respective definitions; and FIG. 10 is a diagram illustrating another example of a PostScript printer description file.

DETAILED DESCRIPTION OF THE PREFERRED EMBODIMENTS

As described above, snmpInk, which is a Mac OS standard program, or a vendor-created CommandFileFilter is used to obtain supply information such as the amount of remaining toner.

Command communications tools such as CommandFileFilter, however, have a problem in that inconvenience may arise depending on a printing protocol (communications protocol) determined by a printer.

For example, in CUPS (Common Unix Printing System) adopted by the Macintosh, only the side channel of a backend that manages the communications of CUPS with a printer may be used in using CommandFileFilter in the case of obtaining supply information. In this case, the backend is made open, but is closed without a flow of print data to the backend. No data are output to a print port because only SNMP communications are performed.

Therefore, there is a problem in that this operation causes malfunction in each of the backends of LPD (Line Printer Daemon Protocol) and IPP (Internet Printing Protocol), which are printing protocols. For example, in the case of IPP, there is the problem of spooler stoppage. In the case of LPD, there is a problem in that a corrupt job remains in a print queue and the next job is prevented from flowing unless the corrupt job is deleted. This is because the input of zero-byte data to and the output of zero-byte data from a print port are determined as invalid operations.

Therefore, there are demands for selecting a communication path depending on a printing protocol. For example, it is desired to use snmpInk of the OS and not to use CommandFileFilter in LPD and IPP, while it is desired to use CommandFileFilter in USB (Universal Serial Bus) and Bonjour (Socket 9100).

Which communication path (tool) to use, however, is determined by the definition of a PostScript printer description file (PPD) at the time of creating a print queue. Therefore, it is necessary for a single machine to create a printer description file for each printing protocol and to select a printer description file in consideration of a printing protocol, which causes inconvenience.

According to an aspect of the present invention, an optimum printing system environment is automatically constructed with a printing protocol being transparent to a user at the time of creating a print queue.

A description is given below, with reference to the accompanying drawings, of one or more embodiments of the present invention.

Figure 1:
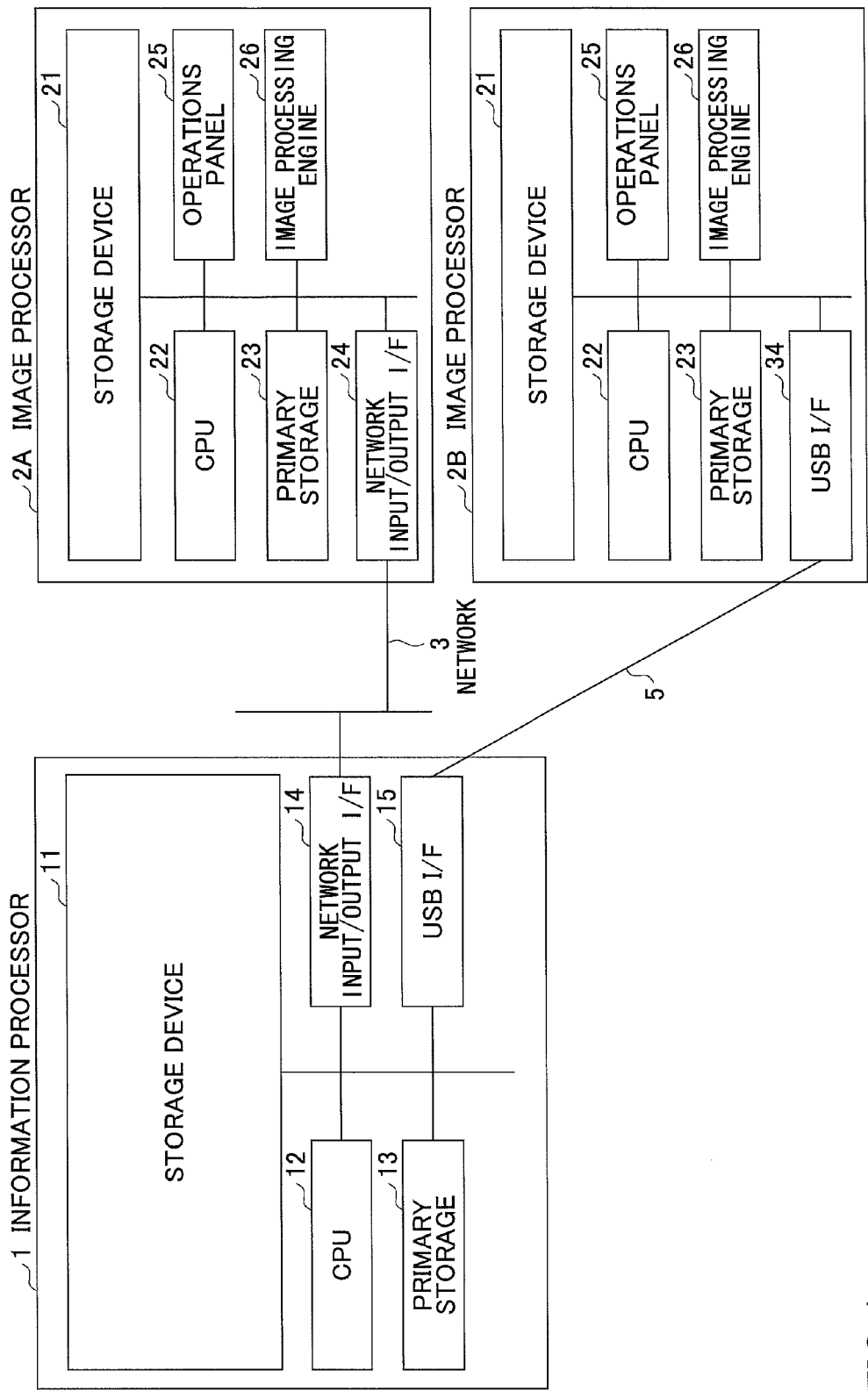
FIG. 1 is a diagram illustrating a system configuration according to an embodiment.

FIG. 1 is a diagram illustrating a system configuration according to an embodiment.

Referring to FIG. 1, a system includes an information processor 1 (for example, a PC), an image processor 2A (for example, a printer) connected to the information processor 1 via a network 3, and an image processor 2B (for example, a printer) connected to the information processor 1 via a USB cable 5 or the like.

The information processor 1 includes a storage device 11, a central processing unit (CPU) 12, a primary storage 13 (a memory), a network input/output interface 14, and a USB interface (I/F) 15. The storage device 11 contains applications, an OS including a CUPS printing system and snmpInk, and drivers (printer drivers). The drivers include PPD, a print filter, CommandFileFilter, AutoSetupTool, LawInkTool, Utility, and PlugIn. Examples of the storage device 11 include storage media such as a hard disk drive (HDD), a flash ROM, and a USB memory. The storage device 11 contains (stores) control software (program). The control software is executed on the CPU 12 to implement functions of the information processor 1.

Each of the image processors 2A and 2B includes a storage device 21, a CPU 22, a primary storage 23, an operations panel 25, and an image processing engine 26. Furthermore, the image processor 2A (a printer via a network or a network printer) includes a network input/output interface 24, and the image processor 2B (a local printer) includes a USB interface 34. The storage device 21 stores information. Examples of the storage device 21 include a hard disk drive (HDD), a flash ROM, and a USB memory. The storage device 21 contains processor control software including the copy function, facsimile (FAX) function, a scanner function, a printer function, a user authentication function, and a billing function of a multifunction printer or peripheral (MFP). The processor control software is executed on the CPU 22 to implement the functions of the image processor 2A or 2B by controlling the image processing engine 26, the storage device 21, and the primary storage 23, and to control communications via the network input/output interface 24 or the USB interface 34 and control the operations panel 25.

Figure 2:
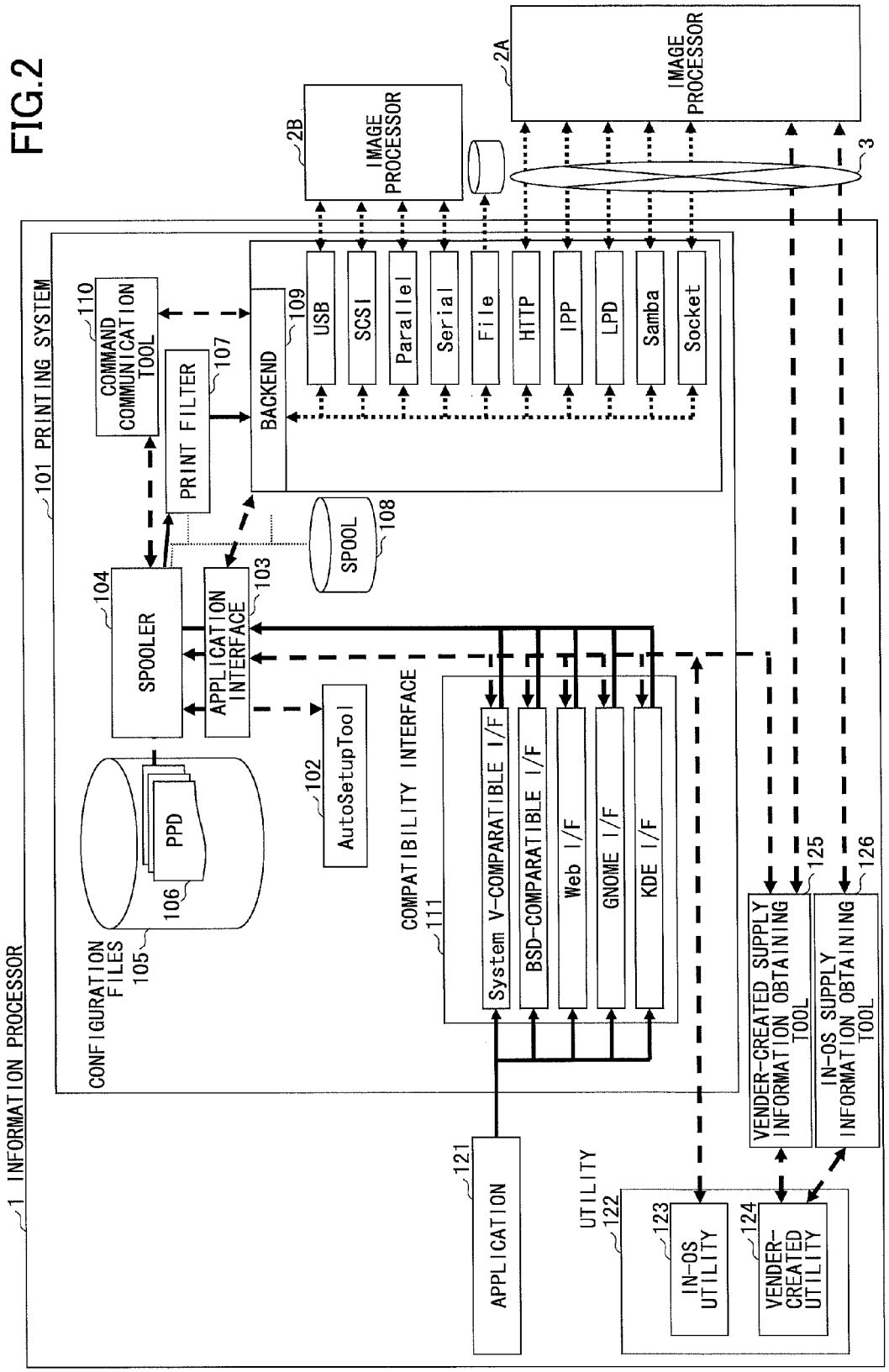
FIG. 2 is a diagram illustrating a functional configuration of an information processor.

FIG. 2 is a diagram illustrating a functional configuration of the information processor 1.

Referring to FIG. 2, the information processor 1 includes a printing system 101 (a CUPS printing system), an application 121, a utility 122, a vendor-created supply information obtaining tool 125 (LawInkTool), and an in-OS supply information obtaining tool 126 (snmpInk). The printing system 101 includes an automatic setup tool 102 (AutoSetupTool), an application interface 103 (CUPS AIP), a spooler 104 (spooler/scheduler), configuration files 105 (including a PostScript printer description file 106 (PPD)), a print filter 107, a spool 108, a backend 109, a command communication tool 110 (CommandFileFilter), and a compatibility interface 111. The utility 122 includes an in-OS utility 123 and a vendor-created utility 124.

Figure 3:
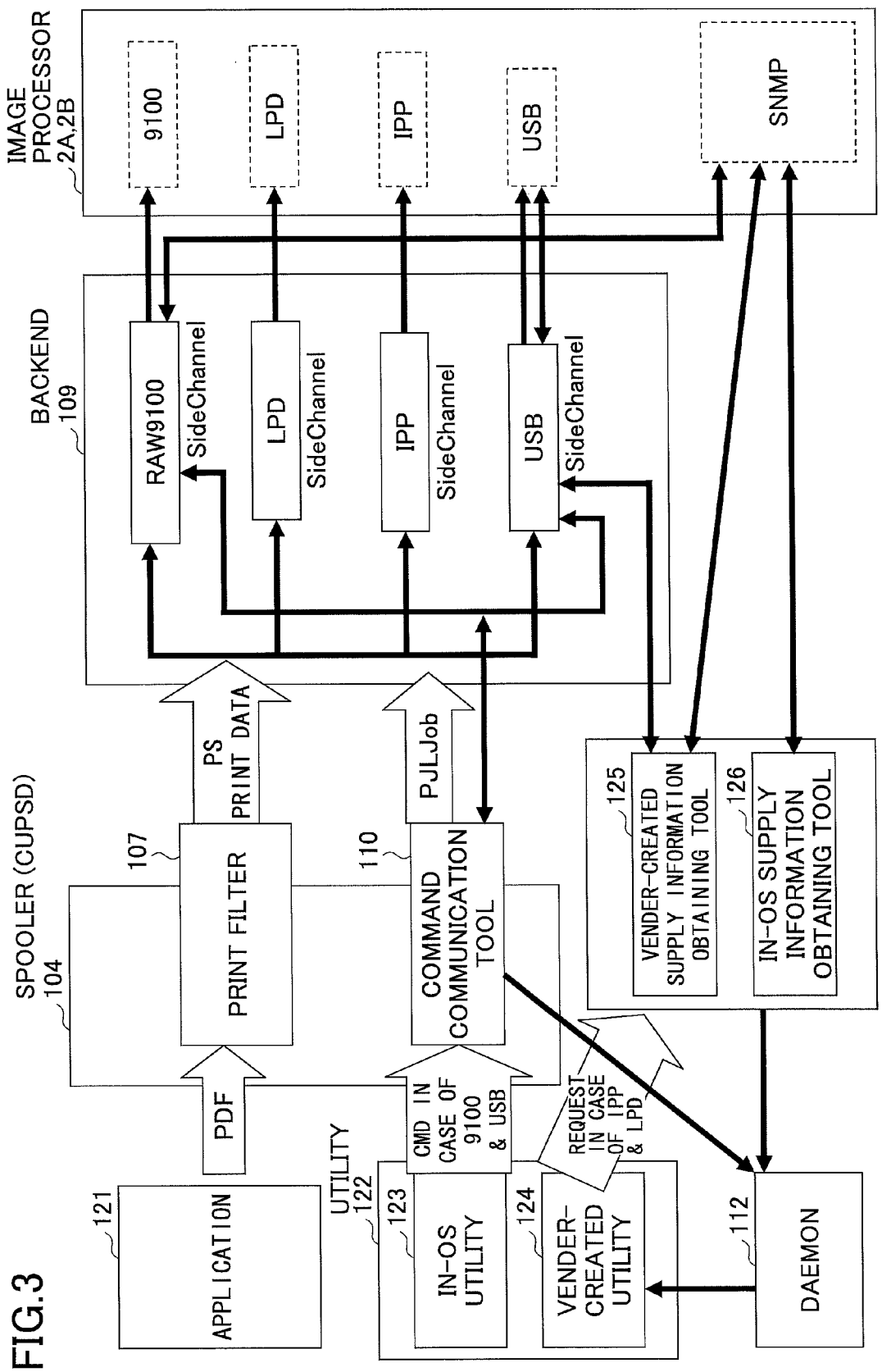
FIG. 3 is a diagram illustrating signal flows inside the functional configuration.

FIG. 3 is a diagram illustrating signal flows inside the functional configuration, illustrating components in signal paths.

Referring to FIG. 3, a print document (to be printed) such as a PDF file output by the application 121 is converted into print data of PS (PostScript) or the like through the print filter 107 to be retained (stored) in the spool 108 (FIG. 2). The print data retained in the spool 108 are output to a module matching a printing protocol to be used in the backend 109, and are transmitted to the image processor 2A or 2B.

When the utility 122 (the in-OS utility 123 or the vendor-created utility 124) obtains supply information from the image processor 2A or 2B, the utility 122 performs bidirectional communications with the image processor 2A or 2B via the side channel of the backend 109 by way of the command communication tool 110 (CommandFileFilter) when the print port is Socket 9100 or USB. The command communication tool 110 notifies a daemon 112 (CUPS Daemon) of the results of the communications. The results of the communications are reflected in the utility 122. The daemon 112 is provided by the printing system 101 (FIG. 2).

In the case of IPP or LPD, the utility 122 does not issue a request to the command communication tool 110 but issues a request to the vendor-created supply information obtaining tool 125 (LawInkTool) or the in-OS supply information obtaining tool 126 (snmpInk), and the vendor-created supply information obtaining tool 125 (LawInkTool) or the in-OS supply information obtaining tool 126 (snmpInk) performs SNMP communications with the image processor 2A without going through the backend 109, and notifies the daemon 112 of the results of the communications. The results of the communications are reflected in the utility 122.

In addition to a function for obtaining supply information, the command communication tool 110 (CommandFileFilter) includes an SNMP communication function for obtaining option configuration information and a function of causing a command for test printing or a command for execution of maintenance of an image processor to flow to the backend 109 in job format of PJL (Printer Job Language).

Figure 4:
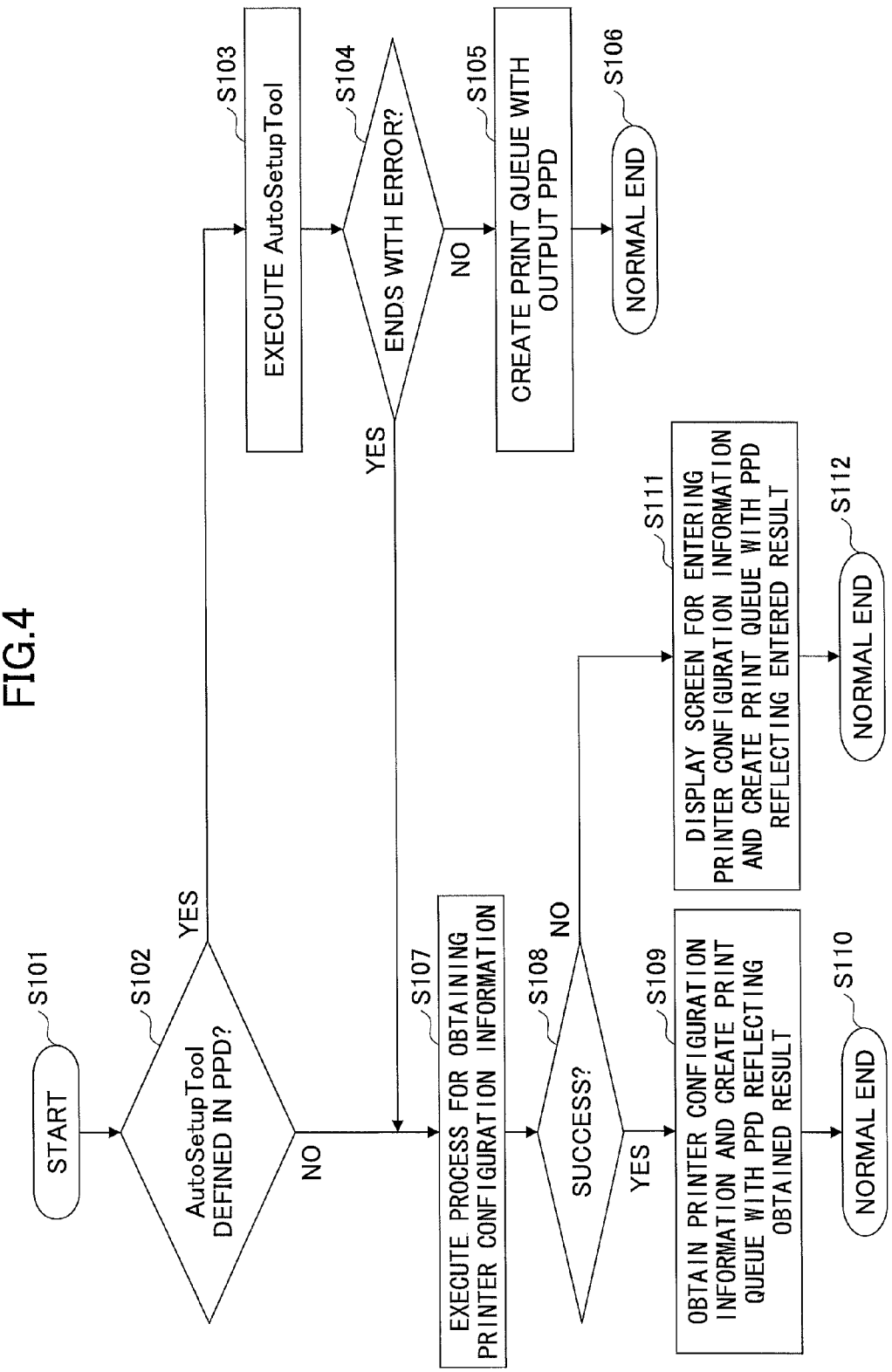
FIG. 4 is a flowchart illustrating a process according to an embodiment.

FIG. 4 is a flowchart illustrating a process according to the above-described embodiment. FIG. 4 illustrates an operation at the time of automatically creating a print queue after printer discovery. The printer discovery function may be any function such as Bonjour or SNMP communications as in Zeroconf of the Macintosh.

Referring to FIG. 4, in step S101, a process is started. Then, after the discovery of a printer, a PPD that matches the printer is discovered from the plug and play information or MIB (Management Information Base) information of the printer. At the time of automatically creating a print queue with the discovered PPD, in step S102, it is determined whether AutoSetupTool is defined in the PPD.

If it is determined that AutoSetupTool is defined in the PPD (YES in step S102), in step S103, AutoSetupTool is executed. A description is given in detail below of the operation of AutoSetupTool.

If the execution of AutoSetupTool succeeds (NO in step S104), optimized PPD data are output. Therefore, in step S105, a print queue is created using the optimized PPD data, and in step S106, the process ends normally. A command acceptable by CommandFileFilter is specified and whether to use snmpInk, which is an OS standard supply information obtaining tool, is specified in the print queue.

If the execution of AutoSetupTool fails (YES in step S104) or if AutoSetupTool is not defined in the PPD (NO in step S102), in step S107, a process for obtaining printer configuration information is executed. The method of obtaining printer configuration information may use any tool such as PS Query or SNMP.

If the obtaining of printer configuration information succeeds (YES in step S108), in step S109, a print queue is created with PPD data reflecting the printer configuration information, and in step S110, the process ends normally.

If the obtaining of printer configuration information fails (NO in step S108), in step S111, a screen for entering printer configuration information is displayed and a print queue is created with PPD data reflecting the printer configuration information entered by a user. Then, in step S112, the process ends normally.

Figure 5:
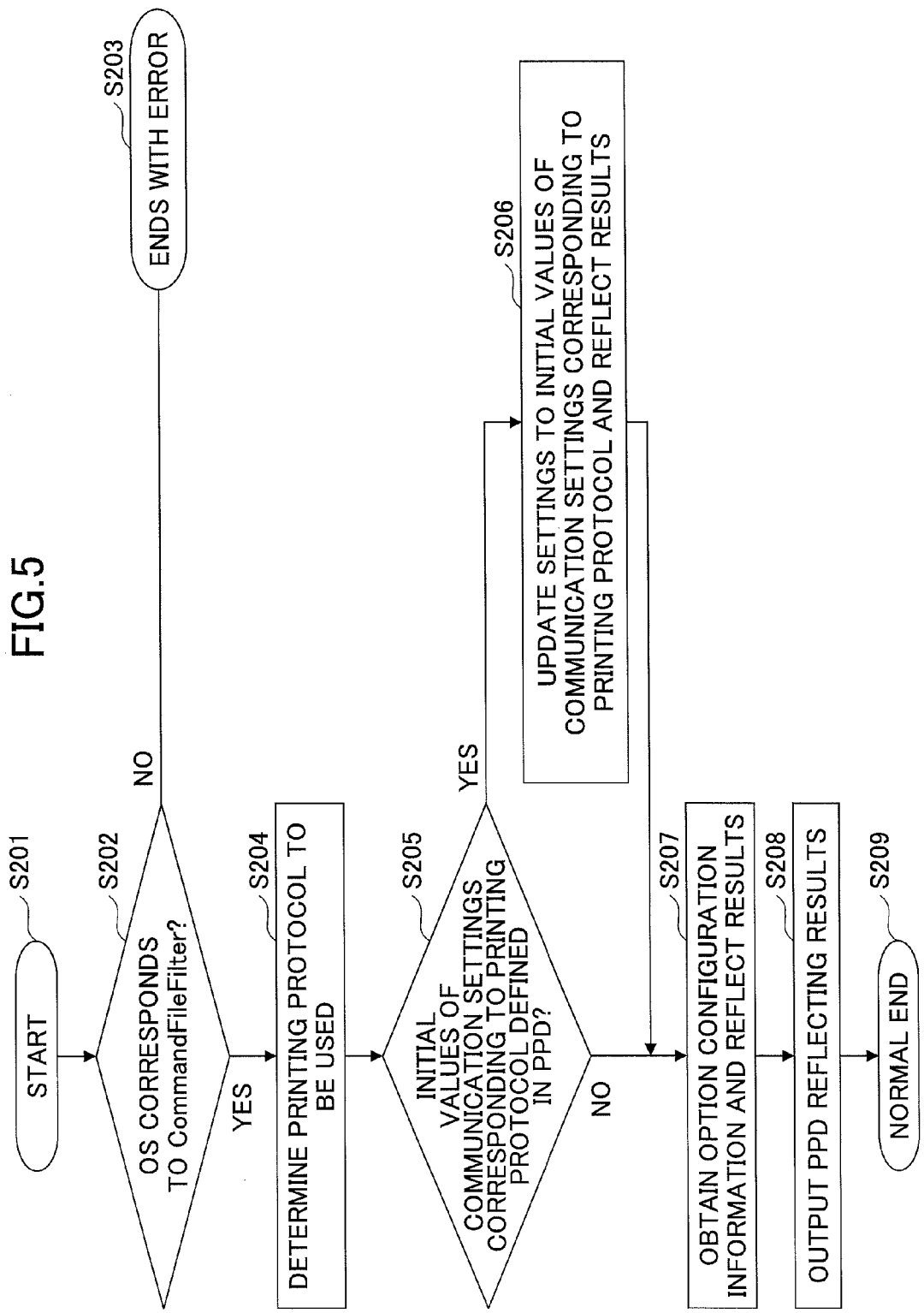
FIG. 5 is a flowchart illustrating a process according to an embodiment.

FIG. 5 is a flowchart illustrating a process of executing AutoSetupTool (step S103 of FIG. 4).

In FIG. 5, in step S201, a process is started. Then, in step S202, it is determined whether the OS supports CommandFileFilter. This determination is performed by calling a function provided by the OS.

If it is determined that the OS does not support CommandFileFilter (NO in step S202), in step S203, the process ends with error. When the process ends with error, an attempt is made to obtain printer configuration information with an OS-side function (steps S107 through S112 of FIG. 4).

If it is determined that the OS supports CommandFileFilter (YES in step S202), in step S204, a printing protocol to be used is checked (determined), and in step S205, it is determined whether initial values of communication settings corresponding to the printing protocol are defined in the PPD.

If initial values are defined (YES in step S205), in step S206, setting values are updated to the initial values of communication settings corresponding to the printing protocol, and the updated values are reflected in PPD data to be output.

Thereafter, or if initial values are not defined (NO in step S205), in step S207, option configuration information is obtained from the printer, and is reflected in PPD data to be output. The method of obtaining option configuration information may use any tool such as PS Query or SNMP.

Next, in step S208, the PPD data in which the initial values of communication settings and/or the option configuration information of the printer is reflected is output, and in step S209, the process ends normally.

FIGS. 6A, 6B, 6C, and 6D are diagrams illustrating an example of the printer description file (PPD) 106. FIGS. 6A through 6D illustrate a single printer description file.

Referring to FIG. 6A, "*cupsCommands" of a description D1 defines a command acceptable by CommandFileFilter. The initial value is empty (" ").

The six lines of a description D2 each starting with "*RICupsCommands" define commands acceptable by "*cupsCommands" corresponding to respective printing protocols.

Furthermore, "*cupsSNMPSupplies" of a description D3 defines whether to use an OS standard supply information obtaining tool (snmpInk). The initial value is "True" (use).

The six lines of a description D4 each starting with "*RICupsSNMPSupplies" define "*cupsSNMPSupplies" corresponding to respective printing protocols.

A description D5 of FIG. 6B, a description D6 of FIG. 6C, and a description D7 of FIG. 6D are original objects of automatic setup by PS Query (that is, option configuration information).

In accordance with a printing protocol to be used, AutoSetupTool reflects the contents of the definition of corresponding "*RICupsCommands" in the definition of "*cupsCommands" and reflects the contents of the definition of corresponding "*RICupsSNMPSupplies" in the definition of "*cupsSNMPSupplies". FIG. 7 illustrates correspondence between printing protocols to be used and the contents of updating (rewriting).

The OS uses CommandFileFilter if a command that is desired to be executed is defined in "*cupsCommands". If a command that is desired to be executed is not defined in "*cupsCommands", the OS uses an OS standard tool or function. Furthermore, the OS uses OS-standard snmpInk if "*cupsSNMPSupplies" is "True".

According to this example definition, when the printing protocol is USB, only supply information is obtained via CommandFileFilter, and OS-standard snmpInk is not used. Because USB is not a network, snmpInk of the OS cannot be used. OS-standard PS Query is used to obtain option configuration information.

When the printing protocol is LPD or IPP, OS-standard snmpInk is used instead of using CommandFileFilter. In LPD and IPP, bidirectional communications using only the side channel of a backend cause inconvenience such as spool stoppage. Therefore, CommandFileFilter is not used. OS-standard snmpInk is used to obtain supply information. OS-standard PS Query is used to obtain option configuration information.

When the printing protocol is Socket, DNSSD, or MDNS, supply information is obtained and printer configuration is automatically reflected via CommandFileFilter, and OS-standard snmpInk is not used.

The initial values of communication settings of each of these printing protocols are only defined in the PPD 106, which is a text file. This makes it possible to facilitate customization in accordance with a user's convenience or an OS patch release.

Next, a description is given of the case of configuring other settings related to image processing in association with communication settings corresponding to a printing protocol. Examples of other setting related to image processing include (a) providing a definition of a command (Clean) for performing head cleaning on the machine (printer) side as in inkjet machines; (b) providing a definition of a command (PrintSelfTestPage) for printing an installation configuration summary on the machine side or a test page; (c) providing a definition of a command (ReportStatus) for reporting a status on the machine side; (d) providing a definition of a command (PrintAlignmentPage) for printing an alignment sheet on the machine side; and (e) providing a definition of a command (SetAlignment) for setting alignment values on the machine side.

FIG. 8 is a diagram illustrating another example of the printer description file (PPD) 106. The process is the same as that illustrated in FIG. 4 and FIG. 5.

Referring to FIG. 8, "*cupsCommands" of a description D11 defines a command acceptable by CommandFileFilter. The initial value is empty (" ").

The six lines of a description D12 each starting with "*RICupsCommands" define commands acceptable by "*cupsCommands" corresponding to respective printing protocols.

FIG. 9 illustrates correspondence between printing protocols to be used and the contents of the updating (rewriting) of their respective definitions according to the description D12 of FIG. 8.

According to this example definition, when the printing protocol is USB, in addition to communication settings by "ReportLevels", other settings related to image processing by "Clean", "PrintSelfTestPage", "ReportStatus", "PrintAlignmentPage", and "SetAlignment" are configured.

When the printing protocol is LPD or IPP, the communication settings are blank, but other settings related to image processing by "Clean" and "PrintSelfTestPage" are configured.

When the printing protocol is Socket, in addition to communication settings by "ReportLevels" and "AutoConfigure", other settings related to image processing by "Clean", "PrintSelfTestPage", "ReportStatus", "PrintAlignmentPage", and "SetAlignment" are configured.

When the printing protocol is DNSSD or MDNS, only communication settings by "ReportLevels" and "AutoConfigure" are configured, and no other settings related to image processing are configured.

The above-described commands used for other settings related to image processing may be simply updated in accordance with a printing protocol. In addition, bidirectional communications may be performed with an image forming apparatus in the updating process by AutoSetupTool (step S206 of FIG. 5), so as to determine whether corresponding functions are installed in the image forming apparatus, and only commands corresponding to the installed functions may be determined as being valid and available for updating.

With respect to specific values used for the settings of alignment values, the kinds and the number of installed alignment sheets, the kinds and the number of alignment values, and the ranges of alignment values may be obtained from the image forming apparatus and be output to part of the printer description file (PPD) 106 by AutoSetupTool. This process may be executed in the updating process by AutoSetupTool (step S206 of FIG. 5).

FIG. 10 illustrates examples of alignment values output to the printer description file (PPD) 106. Referring to FIG. 10, unique keys are assigned to respective items and the items are correlated with respective values. By referring to these data, it is possible for the OS or the utility 122 to display the printing options of appropriate alignment sheets and to cause alignment values to be selected or entered.

As described above, embodiments of the present invention have advantages such as the following:

(a) In creating a print queue, a printing protocol to be used is automatically identified, and a communication path for obtaining supply information and option configuration information is automatically switched to an optimum setting in accordance with the printing protocol to be used. As a result, it is possible to automatically construct an optimum printing system environment while keeping a printing protocol transparent to a user.

(b) By simply editing a PPD, which is a text file, it is possible to respond to a user's convenience or a change in the specification of an OS or a printing backend, so that it is possible to facilitate customization of a communication path in accordance with a printing protocol.

(c) It is possible to configure other settings related to image processing in association with communication settings corresponding to a printing protocol. This makes it possible to further improve convenience.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A printing system, comprising:
a storage part that stores correspondence information that defines a setting of a first communication tool and a second communication tool for obtaining information from an image processor with respect to each of a plurality of protocols, wherein the settings of the first and second communication tools with respect to the plurality of protocols include a command acceptable by the first communication tool and information as to whether to use the second communication tool; and
a processor configured to execute a program stored in the storage part so as to cause the printing system to identify a protocol to be used with respect to the image processor among the plurality of protocols in creating a print queue for displaying a status of the image processor;

determine the setting of the first and second communication tools corresponding to the identified protocol based on the correspondence information; and reflect the determined setting of the first and second communication tools in the print queue.

2. The printing system as claimed in claim 1, wherein the correspondence information is stored in a text file describing initial values of the first and second communication tools, and wherein the processor is configured to execute the program so as to cause the printing system to update the initial values of the first and second communication tools to values of the determined setting of the first and second communication tools, and create the print queue with the text file in which the initial values of the first and second communication tools are updated.

3. The printing system as claimed in claim 1, wherein the correspondence information further defines a setting of an image-processing-related function with respect to each of the plurality of protocols, and wherein the processor is configured to execute the program so as to cause the printing system to determine the setting of the image-processing-related function corresponding to the identified protocol based on the correspondence information, determine whether the image-processing related function of which the setting is determined is installed in the image processor, and reflect the determined setting of the image-processing related function in the print queue in response to determining that the image-processing related function of which the setting is determined is installed in the image processor.

4. The printing system as claimed in claim 3, wherein the processor is configured to execute the program so as to cause the printing system to obtain an alignment value of the image-processing related function installed in the image processor by performing bidirectional communications with the image processor, and reflect the alignment value in the print queue.

5. The printing system as claimed in claim 1, wherein the processor is configured to execute the program so as to cause the printing system to determine whether an operating system of an information processor supports the first communication tool that is other than a standard communication tool of the operating system, and identify the protocol to be used with respect to the image processor in response to determining that the operating system supports the first communication tool.

6. The printing system as claimed in claim 5, wherein the processor is configured to execute the program so as to cause the printing system to determine whether a tool for automatically obtaining and setting option configuration information of the image processor at a time of creating the print queue is defined in a text file storing the correspondence information, and determine whether the operating system of the information processor supports the first communication tool in response to determining that the tool for automatically obtaining and setting the option configuration information of the image processor is defined in the text file.

7. The printing system as claimed in claim 1, wherein the first communication tool is a command communication tool created by a third vendor and the second communication tool is the standard communication tool of the operating system.

8. An information processor, comprising:

a storage part that stores correspondence information that defines a setting of a first communication tool and a second communication tool for obtaining information from an image processor with respect to each of a plurality of protocols, wherein the settings of the first and second communication tools with respect to the plurality of protocols include a command acceptable by the first communication tool and information as to whether to use the second communication tool; and a processor configured to execute a program stored in the storage part so as to cause the information processor to identify a protocol to be used with respect to the image processor among the plurality of protocols in creating a print queue for displaying a status of the image processor;

determine the setting of the first and second communication tools corresponding to the identified protocol based on the correspondence information; and reflect the determined setting of the first and second communication tools in the print queue.

9. The information processor as claimed in claim 8, wherein the correspondence information is stored in a text file describing initial values of the first and second communication tools, and wherein the processor is configured to execute the program to cause the information processor to update the initial values of the first and second communication tools to values of the determined setting of the first and second communication tools, and create the print queue with the text file in which the initial values of the first and second communication tools are updated.

10. The information processor as claimed in claim 8, wherein the processor is configured to execute the program so as to cause the information processor to determine whether an operating system of the information processor supports the first communication tool that is other than a standard communication tool of the operating system, and identify the protocol to be used with respect to the image processor in response to determining that the operating system supports the first communication tool.

11. The information processor as claimed in claim 10, wherein the processor is configured to execute the program so as to cause the information processor to determine whether a tool for automatically obtaining and setting option configuration information of the image processor at a time of creating the print queue is defined in a text file storing the correspondence information, and determine whether the operating system of the information processor supports the first communication tool in response to determining that the tool for automatically obtaining and setting the option configuration information of the image processor is defined in the text file.

12. A non-transitory computer-readable storage medium having a program stored thereon, wherein the program is executed by a processor of a computer to cause the computer to:
- identify a protocol to be used with respect to an image processor among a plurality of protocols in creating a print queue for displaying a status of the image processor;
- determine, based on correspondence information that defines a setting of a first communication tool and a second communication tool for obtaining information from the image processor with respect to each of the plurality of protocols, wherein the settings of the first and second communication tools with respect to the plurality of protocols include a command acceptable by the first communication tool and information as to whether to use the second communication tool, the setting of the first and second communication tools corresponding to the identified protocol; and
- reflect the determined setting of the first and second communication tools in the print queue.

13. The non-transitory computer-readable storage medium as claimed in claim 12,
- wherein the correspondence information is stored in a text file describing initial values of the first and second communication tools, and
- wherein the program is executed by the processor of the computer to cause the computer to
- update the initial values of the first and second communication tools to values of the determined setting of the first and second communication tools, and
- create the print queue with the text file in which the initial values of the first and second communication tools are updated.

14. The non-transitory computer-readable storage medium as claimed in claim 12, wherein the program is executed by the processor of the computer to cause the computer to
- determine whether an operating system of the computer supports the first communication tool that is other than a standard communication tool of the operating system, and
- identify the protocol to be used with respect to the image processor in response to determining that the operating system supports the first communication tool.

15. The non-transitory computer-readable storage medium as claimed in claim 14,
- wherein the program is executed by the processor of the computer to cause the computer to
- determine whether a tool for automatically obtaining and setting option configuration information of the image processor at a time of creating the print queue is defined in a text file storing the correspondence information, and
- determine whether the operating system of the computer supports the first communication tool in response to determining that the tool for automatically obtaining and setting the option configuration information of the image processor is defined in the text file.

* * * * *